United States Patent [19]

Matsumoto

[11] Patent Number: 4,617,882
[45] Date of Patent: Oct. 21, 1986

[54] APPARATUS FOR DRIVING CAMSHAFTS IN AN INTERNAL COMBUSTION ENGINE

[75] Inventor: Yutaka Matsumoto, Saitama, Japan

[73] Assignee: Honda Giken Kogyo Kabushiki Kaisha, Tokyo, Japan

[21] Appl. No.: 587,787

[22] Filed: Mar. 9, 1984

[30] Foreign Application Priority Data

Mar. 11, 1983 [JP] Japan .................................. 58-39128

[51] Int. Cl.⁴ ............................................. F01L 1/02
[52] U.S. Cl. ............................... 123/90.31; 123/90.27; 123/195 A
[58] Field of Search ............... 123/90.31, 90.27, 195 A

[56] References Cited

U.S. PATENT DOCUMENTS

| | | | |
|---|---|---|---|
| 1,406,271 | 2/1922 | Michelsen | 123/90.27 |
| 1,424,428 | 8/1922 | Vincent | 123/90.27 |
| 3,482,553 | 12/1969 | Buchwald | 123/90.31 |
| 3,732,855 | 5/1973 | Jackson | 123/90.31 |
| 4,230,074 | 10/1980 | Ichikawa et al. | 123/90.31 |
| 4,395,980 | 8/1983 | Tominaga et al. | 123/90.31 |
| 4,465,037 | 8/1984 | Tanaka | 123/90.31 |

FOREIGN PATENT DOCUMENTS

| | | | |
|---|---|---|---|
| 146077 | 1/1981 | Fed. Rep. of Germany | 123/90.31 |
| 168012 | 10/1982 | Japan | 123/90.31 |
| 103163 | 1/1917 | United Kingdom | 123/90.31 |

*Primary Examiner*—Ira S. Lazarus
*Attorney, Agent, or Firm*—Sughrue, Mion, Zinn, Macpeak & Seas

[57] ABSTRACT

A camshaft driving apparatus for an internal combustion engine including cam gears rotatably supported by respective camshafts, a timing gear rotatably supported by a crankshaft, and a gear train having at least two intermediate gears cooperatively engaged with one another for cooperatively engaging the cam gears with the timing gear therethrough. The at least two intermediate gears are rotatably mounted to a holding member, thereby forming a single unit before mounting the intermediate gears to an engine body. The unit is thereafter mounted to the body by clamping the holding unit to the body.

7 Claims, 13 Drawing Figures

FIG. 6
FIG. 7
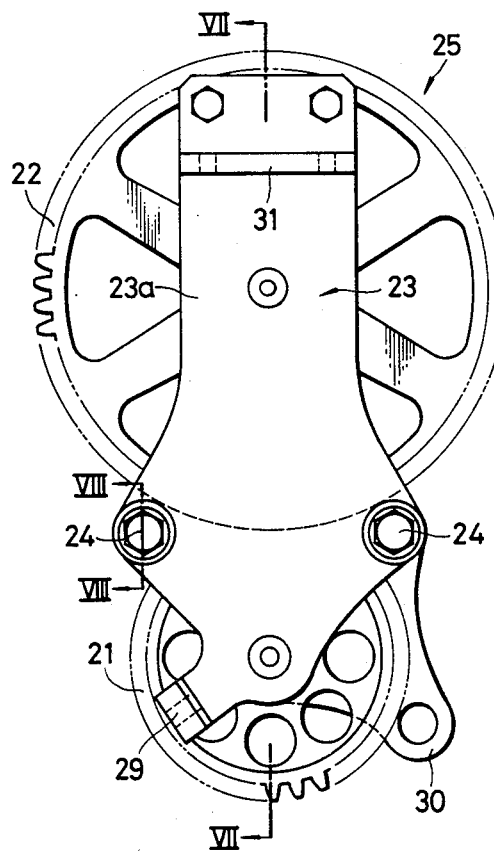
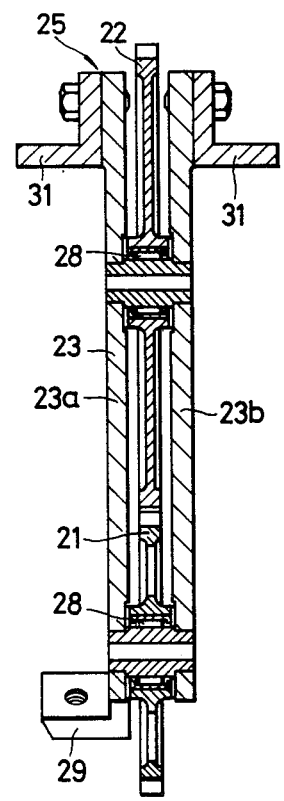
FIG. 8
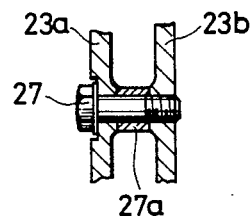

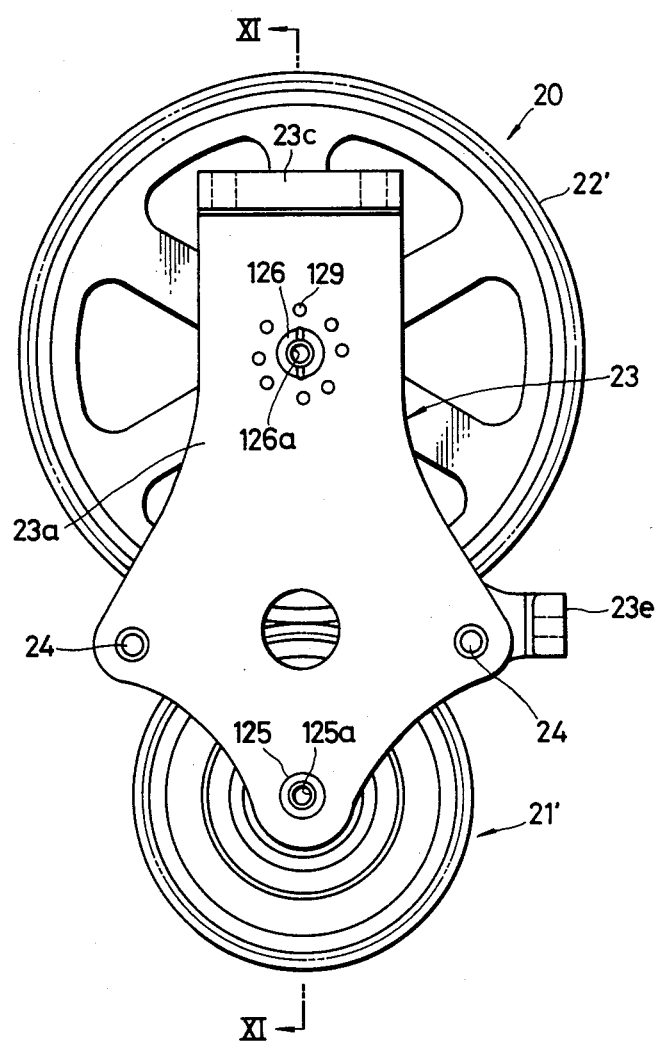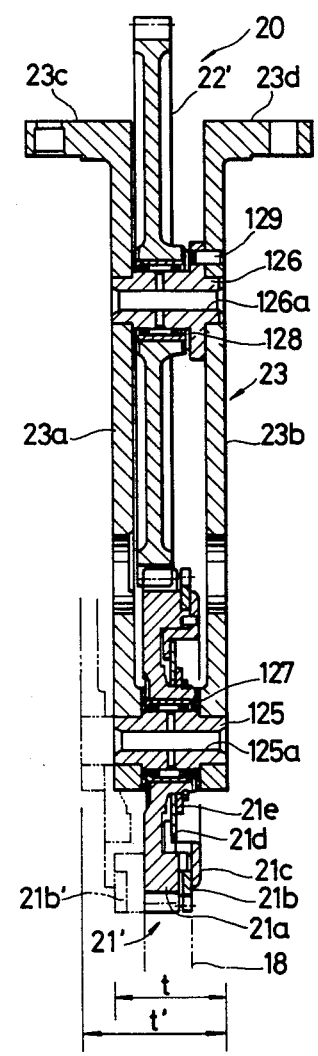
FIG. 10
FIG. 11

APPARATUS FOR DRIVING CAMSHAFTS IN AN INTERNAL COMBUSTION ENGINE

BACKGROUND OF THE INVENTION

The present invention relates to an apparatus for driving camshafts in an internal combustion engine of a vehicle such as a motorcycle.

In a typical example of a conventional camshaft driving apparatus, gears rotatably supported by respective camshafts provided at an upper portion of an engine body and a gear rotatably supported by a crankshaft provided at a lower portion of the engine body are cooperatively connected through a gear train including at least two intermediate gears which are engaged to each other so as to drive the camshafts from the crankshaft through the gear train. Such an arrangement is disclosed in Japanese Laid-Open Patent Application No. 59346/81.

In such a conventional camshaft driving apparatus, the intermediate gears are mounted in the engine body by fixedly mounting respective shafts for rotatably supporting the associated intermediate gears to the engine body after assembling the intermediate gears on the respective shafts, which is a complicated assembly operation.

SUMMARY OF THE INVENTION

An object of the present invention is to eliminate the drawbacks in the prior art as described above.

To this end, according to an aspect of the present invention, in a camshaft driving apparatus for an engine where gears rotatably supported by respective camshafts provided at an upper portion of an engine body are cooperatively connected to a gear rotatably supported by a crankshaft provided at a lower portion of the engine through a gear train including at least two intermediate gears engaged with each other, the at least two intermediate gears are mounted to a common holding member to thereby form one unit, and thereafter the unit is fixedly mounted in the engine body by clamping the holding member to the engine body through bolts and other clamping members.

According to another aspect of the present invention, the camshaft driving apparatus for an engine is constructed so as to absorb backlash generated between the intermediate gears and between the gear train and the gears rotatably supported by the camshafts and the crankshaft. To this effect, the at least two intermediate gears are rotatably mounted on a unit frame having a thermal expansion coefficient substantially the same as that of the intermediate gears so as to engage properly therewith, thereby forming an intermediate gear unit before the intermediate gears are mounted to the engine body. Thereafter, the intermediate gear unit is mounted to the engine body by mounting the unit frame to the engine body. Further, a timing gear rotatably supported by the crankshaft and cam gears rotatably supported by the camshafts are engaged with the intermediate gears through respective backlash absorbing members. With this structure, backlash generated by the intermediate gears, cam gears and timing gear when the engine temperature increases can be absorbed with a mechanism which does not require enlarging the size of the engine body, little noise is generated by the engagement of the gears, and the assembly of the intermediate gears to the engine body is made easy.

BRIEF DESCRIPTION OF THE DRAWINGS

FIG. 6 is a plan view of an intermediate gear unit utilized in the first embodiment;

FIG. 7 is a cross-sectional view of the intermediate gear unit cut away along a line VII—VII in FIG. 6;

FIG. 8 is a partially cross-sectional view of the intermediate gear unit cut away along a line VIII—VIII in FIG. 6.

FIG. 10 is a plan view of an intermediate gear unit utilized in the second embodiment;

FIG. 11 is a cross section of the intermediate gear unit cut away along a line XI—XI in FIG. 10;

DESCRIPTION OF THE PREFERRED EMBODIMENTS

A first embodiment of the present invention will be explained referring to FIGS. 1 to 8.

Figure 1:
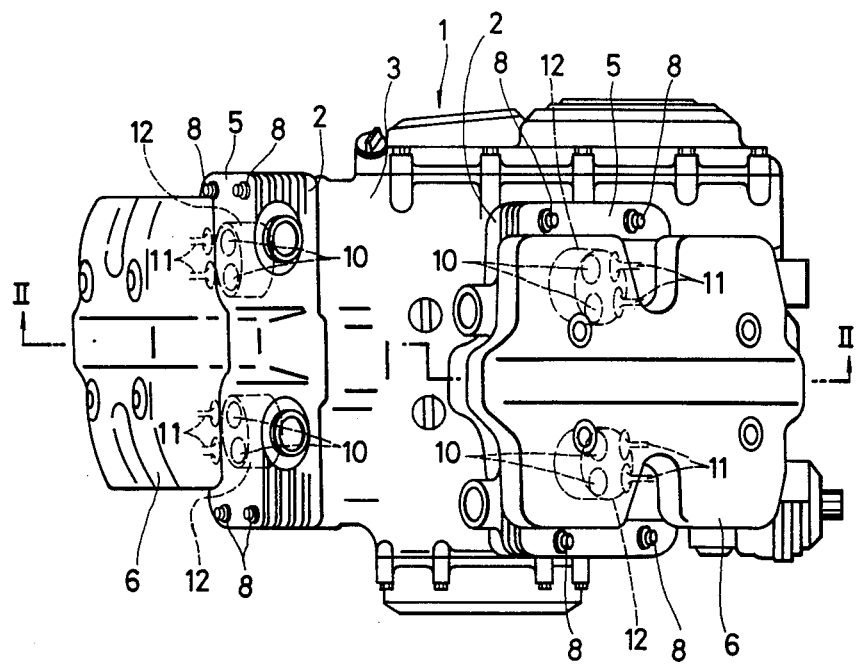
FIG. 1 is a plan view of an internal combustion engine having a camshaft driving apparatus according to the present invention.
Figure 2:
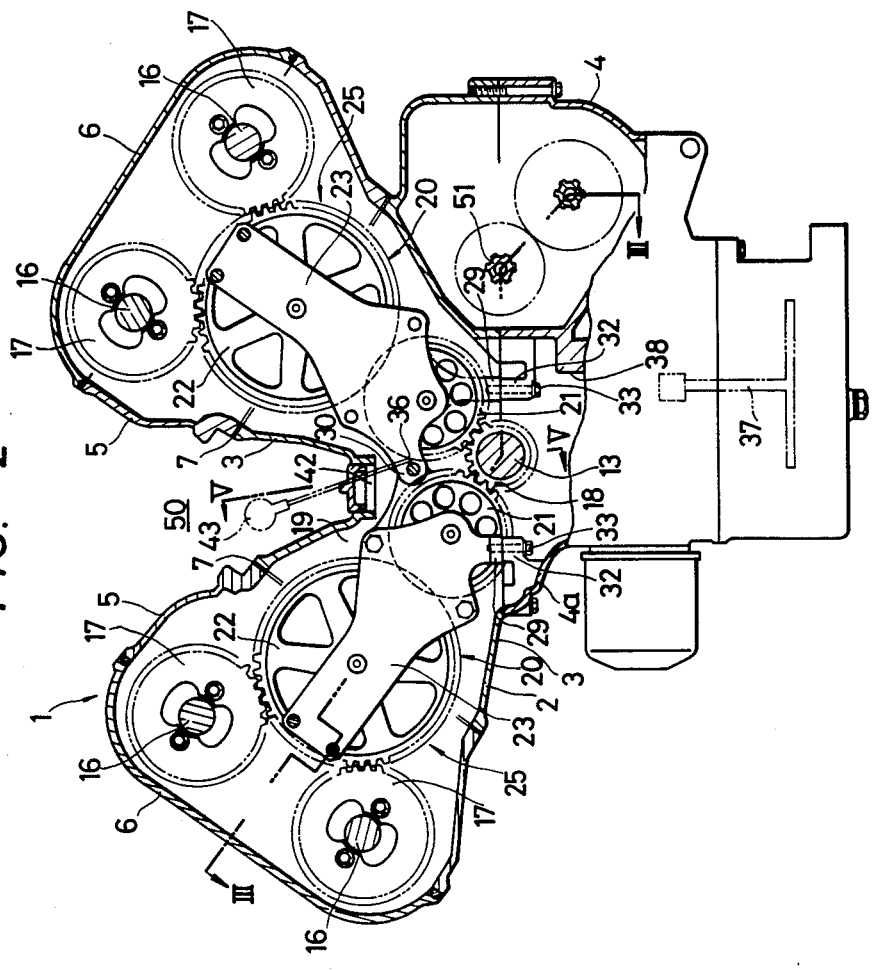
FIG. 2 is a cutaway view of the engine of FIG. 1 with a first embodiment of the camshaft driving apparatus according to the present invention being shown in cutaway view along a line II—II in FIG. 1.
Figure 3:
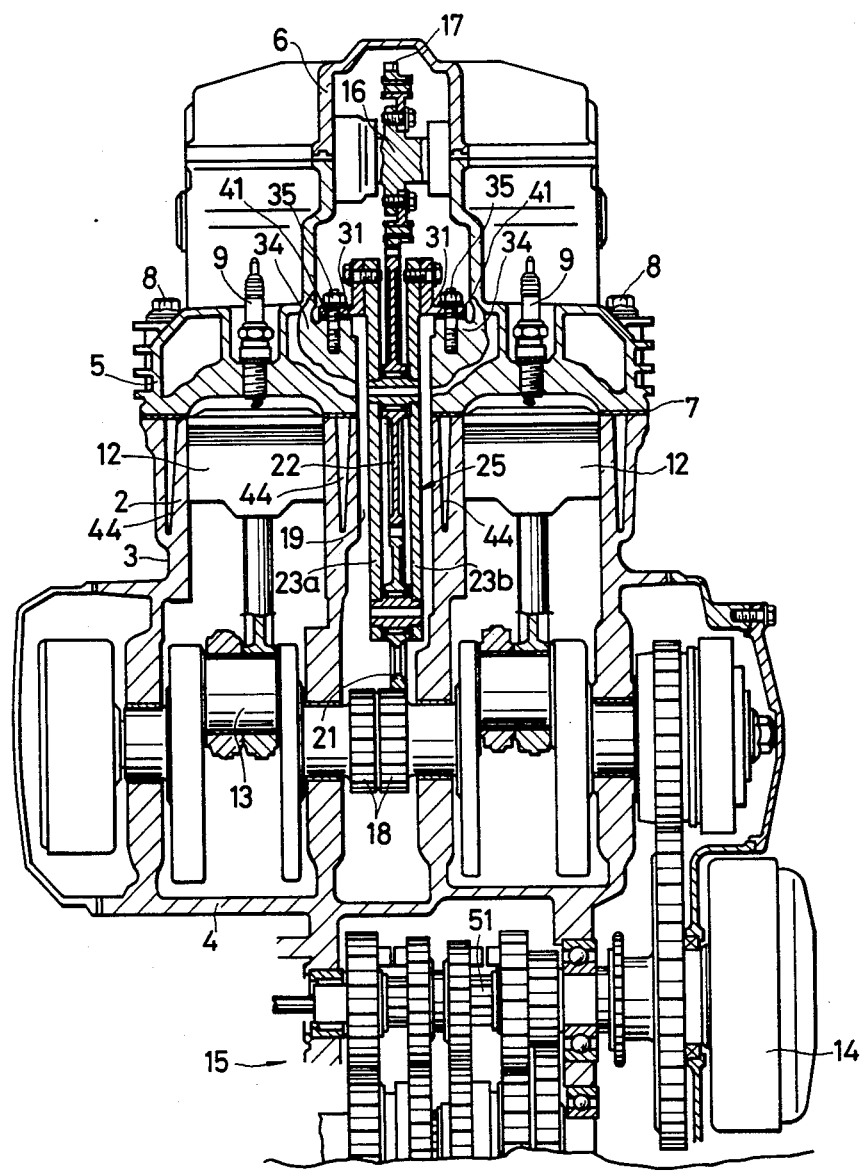
FIG. 3 is a cross-senctional view of the engine cut away along a line III—III in FIG. 2.

In FIGS. 1 to 3, an engine body 1 includes a cylinder block 3 having two pairs of cylinders disposed in a V configuration, a crankcase 4 disposed below the cylinder block 3 as viewed in FIG. 2, and a pair of cylinder heads 5 disposed above the cylinder block 3 in FIG. 2 and a pair of cylinder head covers 6 disposed above the cylinder heads 5 as viewed in FIG. 2 thereby constituting a V-4 engine.

Each of the cylinder heads 5 is clamped on the upper surface of the cylinder block 3 by a cylinder stud bolt 8 through a gasket 7 as shown in FIGS. 2 and 3. Each of the cylinders 2 is provided with an ignition plug 9, a pair of intake valves 10 and a pair of exhaust valves 11 at the head portion thereof. A piston 12 received in each of the cylinders 2 is connected to a common crankshaft 13 in the crankcase 4. The reciprocating motion of the pistons 12 is converted to rotary motion of the crankshaft 13, and the vehicle is driven by the rotary motion of the crankshaft 13 through an output shaft 50, a clutch 14 and a transmission 15. The opposing side surfaces of the cylinder heads 5 form a V-bank space 50 therebetween as shown in FIG. 2.

Figure 4:
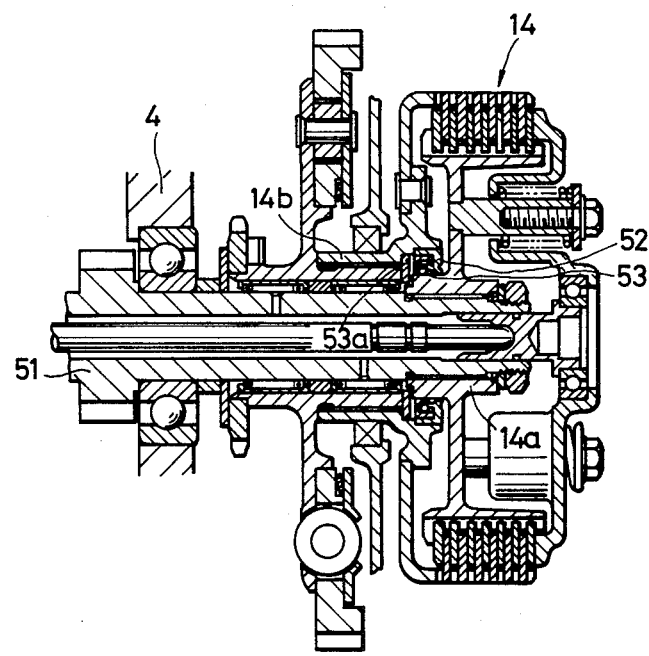
FIG. 4 is a partially cross-sectional view of a clutch shown in FIG. 3.

The clutch 14 includes an inner portion 14a and an outer portion 14b seen in FIGS. 3 and 4. A U-shaped sealing member 52 made of rubber or other such material is inserted in a space between the inner and outer portions. The sealing member 52 is provided with a coil spring 53 at an outer periphery of a lip portion thereof and a retainer ring 53a at an outer periphery of the coil spring.

The engine body 1 is further provided with a pair of camshafts 16 in each of the cylinder head covers 6 and the crankshaft 13 in the crankcase 4. The cam gears 17, rotatably supported by the camshafts 16, and a timing gear 18, rotatably mounted on the crankshaft 13, are operatively connected through an intermediate gear unit 20 having two intermediate gears 21 and 22 which are engaged with one another. Thus, the camshafts 16 are driven by the crankshaft 13 through the intermediate gear unit.

In this embodiment, the intermediate gear unit 20 is commonly provided for a pair of the cylinders 2 in a space 19 in each pair of cylinders (as shown in FIG. 2) such that the intermediate gear unit 20 drives each of the cam gears 17 rotatably supported by the camshafts 16 associated with the corresponding pair of cylinders.

According to the present invention, the intermediate gears 21 and 22 are rotatably mounted to a holding member 23 to thereby form a unit 25. The unit 25 is thereafter disposed in the engine body 1 at a predetermined position where the gears 21 and 22 are disposed between the gears 17 and 18, and thereafter the holding member 23 is mounted to the engine body 1 through bolts and other clamping members.

Figure 5:
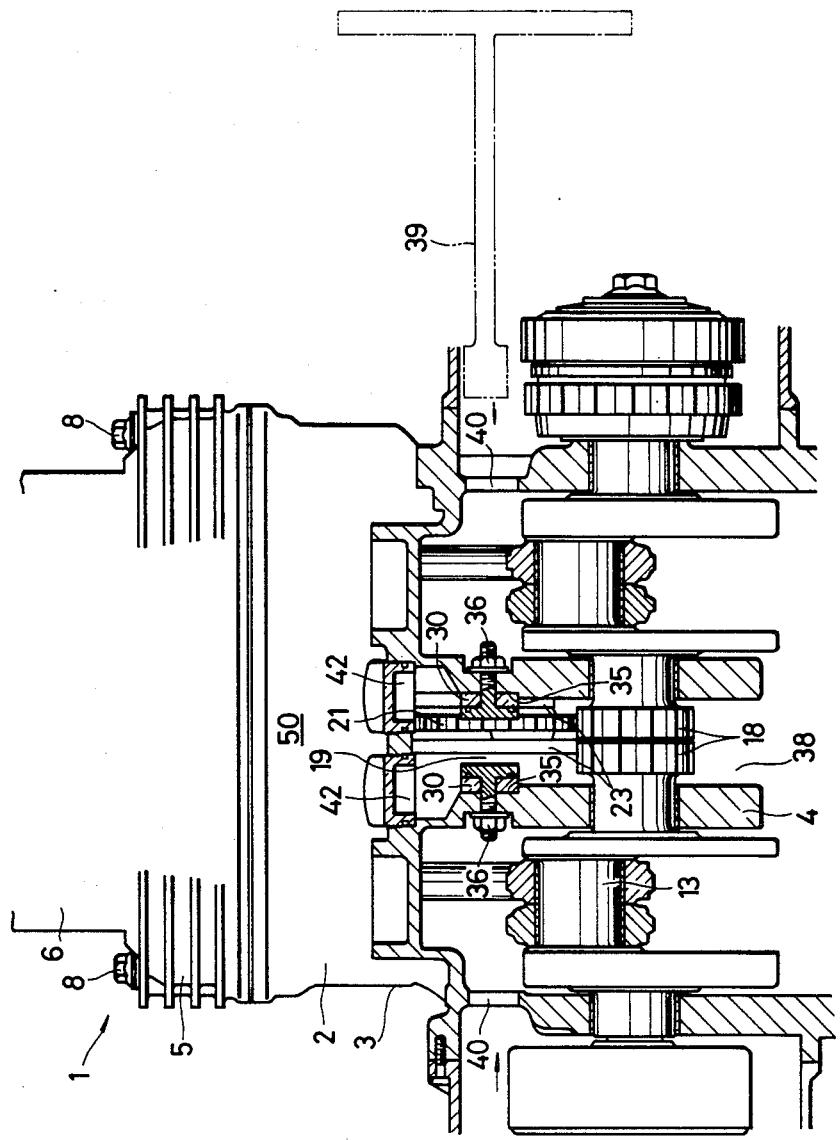
FIG. 5 is a partially cross-sectional view of the engine cut away along a line V—V in FIG. 2.

The constructions of the unit 25 will be described in detail referring to FIGS. 6 to 8. In FIGS. 6 to 8, the holding member 23 is formed by clamping a pair of holding plates 23a and 23b by a pair of bolts 27 through spaces 27a and 27b. The intermediate gears 21 and 22 are disposed between the pair of holding plates 23a and 23b and journaled by a pair of bearings 28, in such a manner that the gears 21 and 22 are journaled by respective lower and upper bearings 28, as shown in FIG. 6, to thereby constitute the unit 25. Thereafter, the unit 25 is disposed in the engine body 1 at such a position that the pair of gears 21 and 22 are positioned at the predetermined position between the gears 17 and 18, and thgn the unit 25 is fixedly connected to the engine body 1 by mounting the holding member 23 thereto by bolts and other clamping members. The clamping members preferably include, in this embodiment, first and second leg portion 29 and 30 extending below the holding member 23, and a pair of third leg portions 31 extending above the holding member 23, as shown in FIGS. 6 and 7. The first leg portion 29 is placed in a seat 32 formed at an associated lower-half portion 4a of the crankcase 4 and then mounted to the crankcase by a screw 33 as shown in FIGS. 2 and 5. The third leg portions 31 are placed on a pair of seats 34 formed in the cylinder head 5 and then mounted to the cylinder head by screws 35 as shown in FIGS. 2 and 3. The second leg portion 30 is abutted against a seat 35 formed at a side portion of the crankcase 4 and mounted to the crankcase by a screw 36 as shown in FIG. 5. In FIGS. 2 and 5, reference numeral 37 designates a clamping tool for the screw 33, 38 an aperture formed at the bottom portion of the crankcase for passing the tool 37, 39 a clamping tool for the screw 36, and 40 an aperture formed at a side portion of the crankcase opposite the above-mentioned side portion thereof for passing the tool 39.

A member for providing a predetermined amount of backlash is positioned between the gears 17 and 22 and between the gears 18 and 21. The amount of backlash is adjusted by adjusting the thickness of the head gasket 7 and/or providing a shim 41 on each of the seats 34 as shown in FIG. 3. A closable opening 42 is formed at a portion of the cylinder block 3 near the bottom portion of the V-bank space 50 so as to pass a tool for measuring the backlash therethrough as shown in FIG. 2.

In FIG. 3, reference numeral 44 designates a water jacket formed in the cylinder 2. The size of the space 19 may be limited by providing the water jacket, but the space 19 may be designed so as to have a size sufficient for passing the unit 25 in the engine body therethrough in order to assemble the unit 25.

Thus, according to the present invention, a gear train having at least two intermediate gears for operatively connecting the gear mounted on the crankshaft with the gears mounted on the camshafts is mounted to a holding member to thereby form a single unit. The unit is thereafter mounted in the engine body by mounting the holding member to the engine body. Thus, the intermediate gear unit according to the present invention provides ease of assembly compared with the conventional gear unit. This is due to the fact that the conventional gear unit is mounted to the engine body in such a manner that, after mounting the intermediate gears to the respective shafts, the shafts must be fixedly mounted to the engine body.

A second embodiment of the present invention will now be explained referring to FIGS. 9 to 13.

The camshaft driving system for driving the camshaft using gears of the first embodiment does not take thermal expansion of the respective members of the engine into consideration. Thus, in the camshaft driving system of the first embodiment, backlash of the gears increases with the distance between the centers of the engaging gears, which can occur upon a temperature change due to the difference in thermal expansion coefficients between gears made to steel or other such material and the engine block and the holding members of the intermediate gear unit made of a light alloy when the temperature of the engine increased, thereby generating noise. There have been proposed gears which absorb backlash, such as Seller's gears and GM gears. In the Seller's gears, two gears having the same number of teeth are urged together in such a manner as to absorb the backlash. The GM gear is constructed so as to absorb the backlash by utilizing the difference in tooth pitches between two gears which have different number of teeth.

If, however, all of the gears used in the first embodiment are replaced by GM gears or Seller's gears, the width of the engine body will be disadvantageously increased because the thickness of GM gears and Seller's gears is much larger than that of the gears used in the first embodiment.

The second embodiment provides for absorption of backlash without increasing the width of the engine body.

As shown in FIGS. 10 and 11, first and second intermediate gears 21', 22' of the intermediate gear unit 20 of the second embodiment are rotatably supported by gear shafts 125 and 126 through bearings 127 and 128 so as to rotate relative to the respective gear shafts. The gear shafts 125 and 126 are provided with oil holes 125a and 126a for providing lubricant to the bearings 127 and 128, respectively. The bearing 128 associated with the gear shaft 126 has an eccentric diameter such that the distance between the shafts of the first and second intermediate gear 21' and 22' varies with the rotation of the gear shaft 126. Proper engagement between the intermediate gears 21' and 22' is maintained by inserting a pin 129 in a hole of the unit frame 23 at a proper angular position of the gear shaft.

In this embodiment, the material of the unit frame 23 and the first and second intermediate gears 21' and 22' is selected such that the thermal expansion coefficient of the unit frame 23 is substantially same as that of the first and second intermediate gears. Namely, if the intermediate gears 21' and 22' are made of steel, the unit frame 23 is also made of steel material. Thus, the degree of engagement between the intermediate gears 21' and 22' does not change, even if the temperature of the intermediate gear unit 20 increases, because the unit frame 23 and the intermediate gears 21' and 22' expand at the same rate, whereby noise generated by engagement of the intermediate gears 21' and 22' due to an increase of backlash is prevented.

On the other hand, the thermal expansion coefficient of the timing gear 18 and cam gears 17' is different from that of the intermediate gear unit 20, so that the backlash increases at each of the engaging portions between the timing gear 18 and the first intermediate gear 21' and between the cam gear 17' and the second intermediate gear 22' when the temperature of the unit 20 increases. In order to absorb such backlash, this embodiment utilizes backlash absorbing members at the engaging portions between the timing gear 18 and the intermediate gear 21' and between the cam gear 17' and the intermediate gear 22'.

As mentioned above, Seller's gears and GM gears, etc. are well known as backlash absorbing member, either of which may be used at the engaging portions. In this embodiment, a GM gear and a Seller's gear are used as the first intermediate gear 21' and the cam gear 17', respectively. The first intermediate gear 21' includes a main gear 21a and a sub gear 21b having the same diameter but having slightly different numbers of teeth. The intermediate gear 21' is formed by urging the sub gear 21b against the main gear 21a in a face-to-face relation through disc plate 21c, disc springs 21d and washers 21e so as to be rotatable with respect to the main gear 21a as shown in FIG. 11. In this arrangement, backlash generated between the intermediate gear 21' and the timing gear 18 is absorbed due to the difference in tooth pitches between the main and sub gears 21a and 21b.

If it is desired to absorb the backlash generated between the first and second intermediate gears 21' and 22' not by forming them by a material having the same thermal expansion coefficient but by providing a backlash absorbing member to the GM gear 21' used as the first intermediate gear, the thickness of the intermediate gear unit 20 will be increased from t to t' as shown in FIG. 11 because a sub gear 21b' *for absorbing the backlash generated between the first and second intermediate gears 21 and 22' (as shown by a two dot chain line in FIG. 11) must be urged against the main gear 21a,* in addition to the sub gear 21b for absorbing the backlash generated between the gear 21' and the timing gear 18, thereby increasing the width of the engine body 1.

Figure 12:
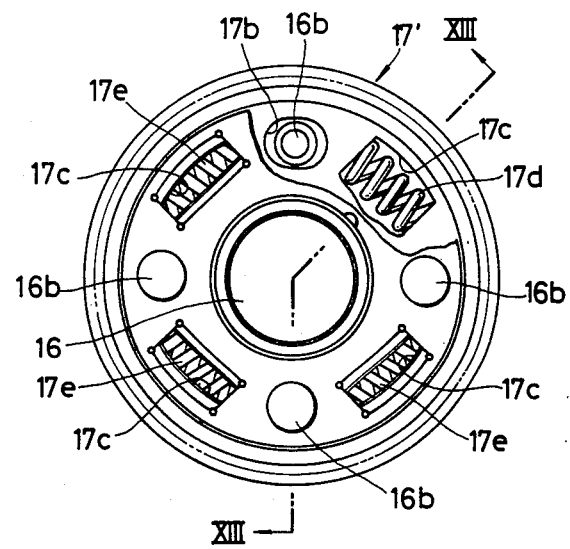
FIG. 12 is a plan of a cam gear utilized in the second embodiment.
Figure 13:
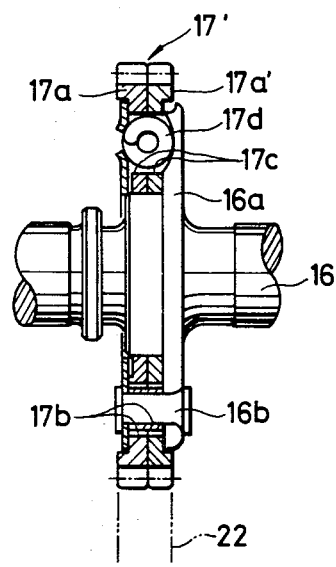
FIG. 13 is a cutaway view of the cam gear taken along a line XIII—XIII in FIG. 12.

The Seller's gear used as the cam gear 17' includes a pair of spur gears 17a and 17a' having the same size, as shown in FIGS. 12 and 13. Each of the spur gears 17a and 17a' is correspondingly provided with a plurality of elongated openings 17b at predetermined circumferential positions. The spur gears 17a and 17a' are supported by the cam shaft 16 so as to be rotatable through predetermined angle in the circumferential direction as determined by a plurality of pins 16b passing through a flange 16a provided at the camshaft 16 and corresponding pairs of the elongated holes 17b of the spur gears. Each of the spur gears 17a and 17a' is provided with a plurality of spring holes 17c at the corresponding circumferential positions. A Seller's spring 17d is provided in a corresponding pair of plural pairs of spring holes 17c formed in the spur gears 17a and 17a' to urge the spur gears 17a and 17b together with permitting relative rotation therebetween, thereby absorbing the backlash generated between the first and second intermediate gears 21' and 22'. Further, damper springs 17e are provided in corresponding other pairs of the spring holes 17c to perform a damping function between the spur gears.

Figure 9:
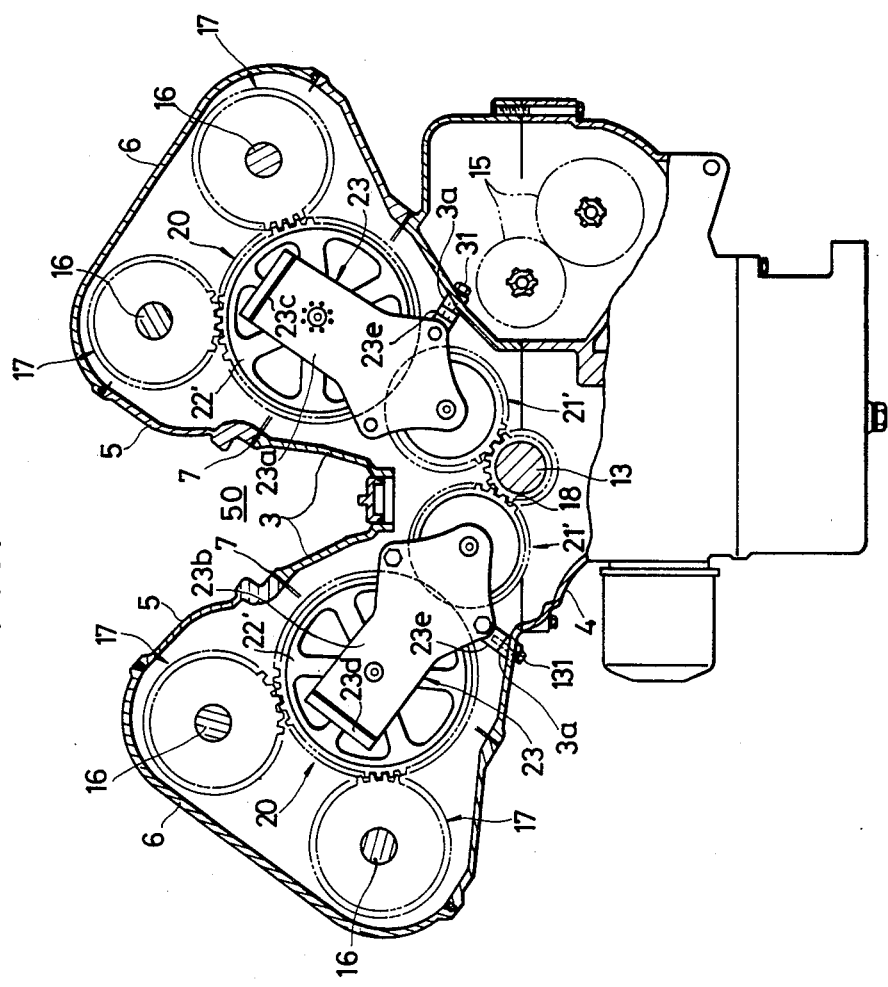
FIG. 9 is a cutaway view of an engine provided with a second embodiment of a camshaft driving apparatus cut away along a line II—II in FIG. 1.

The intermediate gear unit 20 is mounted in the engine body 1 as shown in FIG. 9 in the following manner. At first, the unit 20 is inserted in the space 19 and positioned therein such that the first and second intermediate gears 21' and 22' are simultaneously engaged with the timing gear 18 and the cam gears 17' and 17', respectively. Mounting portions 23c and 23d formed at the upper portions of the holding plates 23a and 23b of the unit frame 23 are aligned with the seats 34 (FIG. 3) and then clamped together by the bolts 35 passing therethrough. Also, a mounting portion 23e provided at a lower portion of one of the holding plates is aligned with a seat 3a (FIG. 9) formed in the cylinder block 3 and then clamped together by a bolt 131 passing therethrough.

As described above, according to the second embodiment of the present invention, at least two intermediate gears are rotatably mounted on a unit frame, the thermal expansion coefficient of which is substantially the same as that of the intermediate gears, so as to engage the intermediate gears with one another, thereby forming an intermediate gear unit. The intermediate gear unit is assembled to the engine body by mounting the unit frame thereto in such a manner that the timing gear rotatably supported by the crankshaft and the cam gears rotatably supported by the camshafts are engaged with one and the other of the intermediate gears through respective backlash absorbing members. In this arrangement, the intermediate gears can be engaged properly with a constant engaging relation therebetween, even if the engine temperature changes, because the thermal expansion coefficient of the intermediate gears is substantially same as that of the unit frame. Further, backlash, which might otherwise be generated when the engine temperature increases, between the timing gear and one of the intermediate gears and between the cam gears and the other intermediate gear is absorbed by providing a backlash absorbing member such as a GM gear or Seller's gear for the cam gears and one of the intermediate gears.

Thus, noise generated by the engagement of the gears due to an increase of the backlash therebetween is prevented without enlarging the size of the engine body. Further, since the intermediate gears are assembled into one unit before mounting them to the engine body, the intermediate gears can be mounted easily in a small space of the engine body.

What is claimed is:

1. A camshaft driving apparatus for a multicylinder internal combustion engine, comprising at least one cam gear mounted on at least one camshaft rotatably supported by an engine body, a timing gear mounted on a crankshaft rotatably supported by said engine body, and a gear train having at least two intermediate gears cooperatively engaged for cooperatively engine said timing gear with said cam gear therethrough, said at least two intermediate gears being rotatably mounted to holding means to thereby form an independent unit before mounting the intermediate gears to said engine body, and said independent unit being fixedly mounted to said engine body by clamping said holding means to said engine body by bolts and other clamping members wherein said independent unit is mounted to said engine body so as to be detachable therefrom and said engine body includes an opening provided between adjacent cylinders of sufficient dimensions to allow said independent unit to pass therethrough so that it can be fixedly mounted to said engine body.

2. The camshaft driving apparatus according to claim 1, further comprising backlash control means interposed between said crankshaft and said at least one camshaft.

3. The camshaft driving apparatus according to claim 2, wherein said backlash control means is disposed between said crankshaft and said independent unit of said intermediate gears.

4. The camshaft driving apparatus according to claim 2, wherein said backlash control means is disposed between said independent unit of said intermediate gears and said camshaft.

5. The camshaft driving apparatus according to claim 2, wherein said backlash control means comprises shims positioned between said holding member and said engine body.

6. The camshaft driving apparatus according to claim 2, wherein said backlash control means comprises a gasket positioned between a cylinder head and a cylinder block of the engine body.

7. The camshaft driving apparatus according to claim 1, wherein said engine is a V-type engine having an opening for viewing said gear train.

* * * * *